3,230,256
N-[3,3 - DIPHENYL - (PROPYLIDENEIMINO - PROPENYL AND PROPYL)]-1-PHENYL - 2 - AMINOPROPANES
Cornelis van der Stelt, Haarlem, Netherlands, assignor to N.V. Koninklijke Pharmaceutische Fabrieken v/h Brocades Stheeman en Pharmacia, Amsterdam, Netherlands, a corporation of Dutch law
No Drawing. Filed Aug. 16, 1963, Ser. No. 302,709
2 Claims. (Cl. 260—566)

This invention relates to a process for the preparation of N-substituted 1-phenylaminoalkanes of the general formula

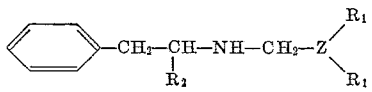

wherein $R_2$ is lower alkyl; each $R_1$ is selected from the group consisting of phenyl and lower alkyl phenyl, e.g., methyl phenyl; and Z is selected from the group consisting of CH=C and $CH_2$—CH and the acid addition salts thereof.

The N-substituted 1-phenylaminoalkanes of this invention are therapeutically useful compounds which exhibit a dilating activity on coronary blood vessels. Of particular importance is the compound wherein $R_2$ is methyl, each $R_1$ is phenyl and Z is $CH_2$—CH, which compound is known for its activity as a coronary dilatant.

The final compounds of this invention may be prepared by first reacting a 1-phenylaminoalkane, e.g., dl-1-phenyl-2-aminopropane, or dl-1-phenyl - 2 - aminobutane with an aldehyde of the general formula

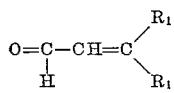

wherein $R_1$ is as hereinbefore defined. to obtain compounds of the formula

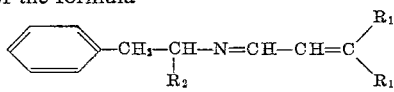

wherein $R_1$ and $R_2$ are as hereinbefore defined. This compound may then be reduced, as by treatment with sodium borohydride, to yield compounds of the formula

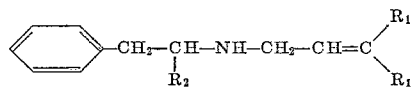

wherein $R_1$ and $R_2$ are as hereinbefore defined. These compounds may then be converted by hydrogenation, most preferably catalytic hydrogenation, employing Raney nickel as the catalyst, to compounds of the formula

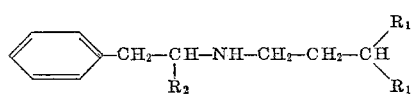

wherein $R_1$ and $R_2$ are as hereinbefore defined.

The aldehyde employed as starting materials in the practice of this invention may be prepared by condensing a ketone of the formula

wherein $R_1$ is as hereinbefore defined, in the presence of a condensing agent, for example, sodamide, with acetylene in a medium of liquid ammonia, to yield an acetylenic compound of the formula

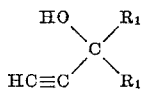

wherein $R_1$ is as hereinbefore defined, and causing isomerization of the acetylenic compound by treatment thereof with an acid, for example, sulfuric acid, to yield an aldehyde of the formula

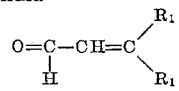

wherein $R_1$ is as hereinbefore defined.

The acid addition salts of the final products of this invention may be obtained by treatment of the aminoalkane base with the equivalent quantity of the desired acid, in an inert solvent, such as diethyl ether. The following examples, in which the temperatures are in degrees centigrade, are illustrative of the invention.

EXAMPLE I

*N-[3-phenyl-3-(p-tolyl)prop-2-enyl]-1-phenyl-2-aminopropane*

A mixture of 0.01 mol of 3-phenyl-3-(p-tolyl)prop-2-enal, 0.01 mol of 1-phenyl-2-aminopropane, 25 ml. of benzene and anhydrous sodium sulphate is left standing overnight. The mixture is filtered and the filtrate concentrated under reduced pressure. To the residue is added 50 ml. of ethanol and 0.5 g. of sodium borohydride. The mixture is boiled under reflux for about one hour. It is then diluted with water. The oily layer is separated, mixed with ether and the ethereal solution washed three times with water. 2 N-hydrochloric acid is then added and the precipitated hydrochloride is filtered off. N-[3-phenyl-3-(p-tolyl)prop-2-enyl] - 1 - phenyl - 2 - aminopropane hydrochloride is obtained in 89% yield. The compound melts at about 201–202° after crystallization from an ethanol-ether mixture.

*Analysis.*—Calcd. for $C_{25}H_{28}NCl$: C, 79.43%; H, 7.47%; N, 3.71%. Found: C, 79.06%; H, 7.52%; N, 3.78%.

The 3-phenyl-3-(p-tolyl)prop-2-enal used as a starting material can be prepared from p-tolyl phenyl ketone in the following way:

A one litre flask is fitted with a dropping-funnel, a gas-inlet tube filled with solid potassium hydroxide and a condenser to the upper end of which a tube filled with solid potassium hydroxide is attached. Flask and condenser are cooled with solid carbon dioxide and acetone. From a gas cylinder a quantity of about 200–250 ml. of ammonia is condensed into the flask through the tube filled with potassium hydroxide. Another flask, fitted with an inlet tube nearly reaching to the bottom, an outlet tube and an ascending tube is filled with water. The inlet tube is connected with two washing-bottles placed in series and filled with concentrated sulphuric acid and, moreover, with a tower filled with glass-wool. The latter system is connected with a supply of nitrogen gas. The air is completely replaced by nitrogen by bubbling same through the system. The nitrogen supply is switched off and a stream of acetylene gas passed through the flask containing water (to remove acetone vapor stemming from the acetone soaked diatomaceous earth, wherein the acetylene is dissolved in the cylinder). The outlet of the tower is then connected with the inlet tube of the flask, containing the liquid ammonia. 0.2 g. atom of sodium in the form of small pieces is added to the ammonia, whilst acetylene is being passed through. If the sodium is added too rapidly the solution turns blue. When the total quantity of sodium has been added (time needed about 30 minutes), the stream of acetylene is throttled down, and thereafter 0.2 mol. of p-tolyl phenyl ketone, dissolved in about 350 ml. of ether, is added during the course of about 45 minutes. The acetylene supply is then cut off, and the reaction mixture is left to react at a temperature of about −60 to −50°. The flask is left to stand overnight without stirring or cooling so as to let the ammonia evaporate.

The reaction mixture is then diluted with water, the ether layer is separated, extracted with water and dried with anhydrous sodium sulphate. The ethereal solution is concentrated after filtration, and petroleum ether (boiling range 28–40°) is added to the residue. The precipitated solid is collected and crystallized from petroleum ether (boiling range 40–60°). 3-phenyl-3-(p-tolyl) propyn-3-ol is obtained in the form of an oil which can be directly used for the next reaction step.

To a refluxing mixture of 50 ml. of ethanol (95%), 15 ml. of water and 5 g. of concentrated sulphuric acid, there is added over a period of 30 minutes, 10 g. of impure 3-phenyl-3-(p-tolyl)propyn-3-ol dissolved in 25 ml. of ethanol (95%). At the end of the addition, the reaction mixture is boiled under reflux for about 15 minutes and then poured after chilling onto ice. The resulting solid is filtered off and crystallized from petroleum ether (boiling range 40–60°). 3-phenyl-3-(p-tolyl)-2-propenal is obtained in 54% yield; its melting point is 82–83.5°.

EXAMPLE II

*N-[3-phenyl-3-(p-tolyl)propyl]-1-phenyl-2-aminopropane*

0.01 mol of N-[3-phenyl-3-(p-tolyl)prop-2-enyl]-1-phenyl-2-aminopropane hydrochloride (prepared as described in Example I) is dissolved in ethanol. A solution of 0.0125 mol of sodium hydroxide in 5 ml. of water is added, followed by about 1 g. of Raney nickel. The flask containing the mixture is connected with a supply of hydrogen and the compound hydrogenated under atmospheric pressure. After the theoretical amount of hydrogen has been taken up, the Raney nickel is filtered off and the filtrate concentrated by distillation under reduced pressure. To the residue ether is added, the ethereal solution is dried with sodium sulphate, filtered and acidified with an ethereal solution of hydrogen chloride. The precipitated hydrochloride of N-[3-phenyl-3-(p-tolyl)propyl]-1-phenyl-2-aminopropane is filtered off and crystallized from a mixture of ethanol and ether. Yield 71%; melting point 179–180°.

*Analysis.*—Calcd. for $C_{25}H_{30}NCl$: C, 79.03%; H, 7.96%; N, 3.69%. Found: C, 78.53%; H, 7.65%; N, 3.94%.

EXAMPLE III

*N-[3-phenyl-3-(o-tolyl)prop-2-enyl]-1-phenyl-2-aminopropane*

Following the procedure described in Example I but substituting 3-phenyl-3-(o-tolyl)prop-2-enal for the 3-phenyl-3-(p-tolyl)prop-2-enal, N-[3-phenyl-3-(o-tolyl)-prop-2-enyl]-1-phenyl-2-aminopropane is prepared. Its hydrochloride, melting at about 150–151°, is obtained in 68% yield.

*Analysis.*—Calcd. for $C_{25}H_{28}NCl$: C, 79.43%; H, 7.47%; N, 3.71%. Found: C, 79.70%; H, 7.28%; N, 3.70%.

The 3-phenyl-3-(o-tolyl)prop-2-enal used as a starting material can be prepared from o-tolyl phenyl ketone in the following way:

Following the procedure described in Example I for the preparation of 3-phenyl-3-(p-tolyl)propyn-3-ol but substituting o-tolyl phenyl ketone for the p-isomer, 3-phenyl-3-(o-tolyl)propyn-3-ol is obtained in the form of an oil. No purification is necessary; it can be used as such for the further conversion step.

Following the procedure described in Example I for the preparation of 3-phenyl-3-(p-tolyl)prop-2-enal but substituting 3-phenyl-3-(o-tolyl)propyn-3-ol for the 3-phenyl-3-(p-tolyl)propyn-3-ol, 3-phenyl-3-(o-tolyl)prop-2-enal is prepared in 77% yield. Melting point 82–83.5°.

EXAMPLE IV

*N-[3-phenyl-3-(o-tolyl)propyl]-1-phenyl-2-aminopropane*

Following the procedure described in Example II but substituting N-[3-phenyl-3-(o-tolyl)prop-2-enyl]-1-phenyl-2-aminopropane hydrochloride for the N-[3-phenyl-3-(p-tolyl)-prop-2-enyl]-1-phenyl-2-aminopropane hydrochloride, N-[3-phenyl-3-(o-tolyl)propyl]-1-phenyl-2-aminopropane hydrochloride is prepared. Yield 85%; melting point 208–209°.

*Analysis.*—Calcd. for $C_{25}H_{30}NCl$: C, 79.03%; H, 7.96%; N, 3.69%. Found: C, 79.17%; H, 7.71%; N, 4.06%.

EXAMPLE V

*N-(3,3-diphenylprop-2-enyl)-1-phenyl-2-aminopropane*

A mixture of 0.01 mol of 3,3-diphenylprop-2-enal (prepared as described by G. F. Hennion, J. Am. Chem. Soc., 77, 3253 (1955)), 0.01 mol of 1-phenyl-2-aminopropane, 25 ml. of benzene and anhydrous sodium sulphate is left standing overnight. The mixture is filtered and the filtrate concentrated under reduced pressure. To the residue is added 50 ml. of ethanol and 0.5 g. of sodium borohydride. The mixture is boiled under reflux for about one hour. It is then diluted with water. The oily layer is separated, mixed with ether and the ethereal solution washed three times with water. 2 N hydrochloric acid is then added and the precipitated hydrochloride is filtered off. N-(3,3-diphenylprop-2-enyl)-1-phenyl-2-amino-propane hydrochloride is obtained in 78% yield. The compound melts at about 202–203° after crystallization from an ethanol-ether mixture.

*Analysis.*—Calcd. for $C_{24}H_{26}NCl$: C, 79.21%; H, 7.20%; N, 3.85%. Found: C, 79.42%; H, 7.02%; N, 3.90%.

EXAMPLE VI

*N-(3,3-diphenylpropyl)-1-phenyl-2-aminopropane*

0.01 mol of N-(3,3-diphenylprop-2-enyl)-1-phenyl-2-amino-propane hydrochloride (prepared as described in Example V) is dissolved in ethanol. A solution of 0.0125 mol of sodium hydroxide in 5 ml. of water is added, followed by about 1 g. of Raney nickel. The flask containing the mixture is connected with a supply of hydrogen and the compound hydrogenated under atmospheric pressure. After the theoretical amount of hydrogen has been taken up, the Raney nickel is filtered off and the filtrate concentrated by distillation under reduced pressure. To the residue ether is added, the ethereal solution is dried with sodium sulphate, filtered and acidified with an ethereal solution of hydrogen chloride. The precipitated hydrochloride of N-(3,3-diphenylpropyl)-1-phenyl-2-aminopropane is filtered off and crystallized from a mixture of ethanol and ether.

Yield 78%; melting point 188–190°.

This invention may be variously otherwise embodied within the scope of the appended claims.

What is claimed is:

1. A compound of the formula

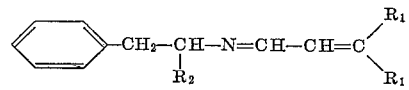

wherein $R_2$ is methyl and each $R_1$ is selected from the group consisting of phenyl and tolyl.

2. A compound of the formula

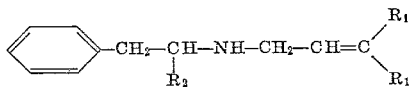

wherein $R_2$ and $R_1$ are as defined in claim 1.

References Cited by the Examiner

UNITED STATES PATENTS 2,738,347  3/1956  Bernstein et al. ____ 260—560 X

FOREIGN PATENTS 213,877  3/1961  Austria.
213,878  3/1961  Austria.
213,879  3/1961  Austria.

OTHER REFERENCES

Adamson: J. Chem. Soc. (London), vol. of 1949, pp. S–144.
Houben-Weyl: "Methoden Der Organischen Chemie," vol. 11/1, pp. 669–670 (1957).
Krabbe: C. A., vol. 30, p. 63745 (1936).
Lespagnol: C. A., vol. 42, p. 727916 (1948).
Stevens et al.: J.A.C.S., vol. 79, pp. 6057–6062 (1957).
White et al.: Brit. J. Pharmacol, vol. 6, pp. 560–571 (1951).

CHARLES B. PARKER, *Primary Examiner.*

FLOYD D. HIGEL, ROBERT V. HINES,
*Assistant Examiners.*